H. WOTTLE.
MANUFACTURE OF WOODEN BELT PULLEYS.
APPLICATION FILED FEB. 12, 1912.

1,066,452.

Patented July 1, 1913.

Witnesses:
H. H. Smith
T. P. Harney

Inventor:
Hans Wottle
per
Lawrence Langner
Attorney.

UNITED STATES PATENT OFFICE.

HANS WOTTLE, OF VIENNA, AUSTRIA-HUNGARY.

MANUFACTURE OF WOODEN BELT-PULLEYS.

1,066,452.  Specification of Letters Patent.  Patented July 1, 1913.

Application filed February 12, 1912. Serial No. 677,113.

*To all whom it may concern:*

Be it known that I, HANS WOTTLE, a subject of the Emperor of Austria-Hungary, residing at 66 Embelgasse, Vienna, in the Empire of Austria-Hungary, have invented certain new and useful Improvements in the Manufacture of Wooden Belt-Pulleys, of which the following is a specification.

The present invention relates to a method of and apparatus for assembling wood belt pulleys, the object being to provide a more rational or systematic method of production than has hitherto been the case by means of which the pulleys can be manufactured with a considerably less expenditure of time and far more exactly. A fundamental condition of this method of production is that the segments of which the pulleys are composed must be cut with absolute exactitude as regards the radius and the chamfering for which purpose a machine is necessary which will form the object of a separate patent.

Figure 1:
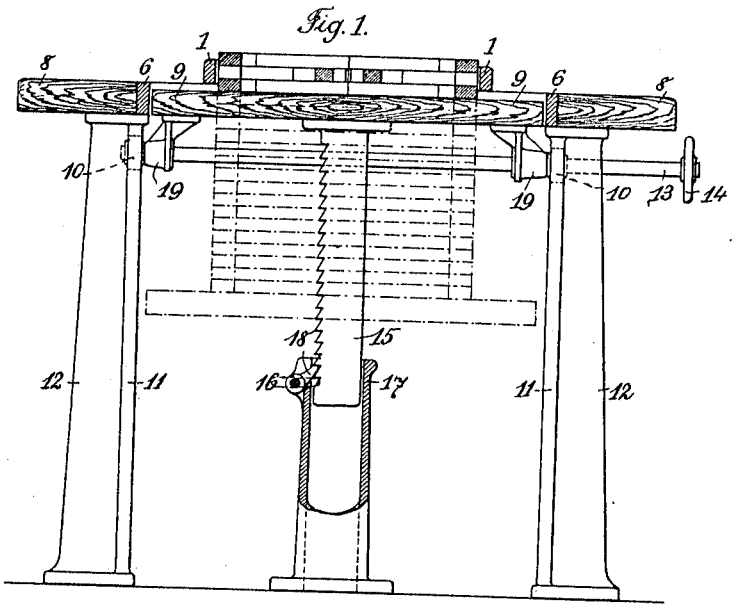
Figure 2:
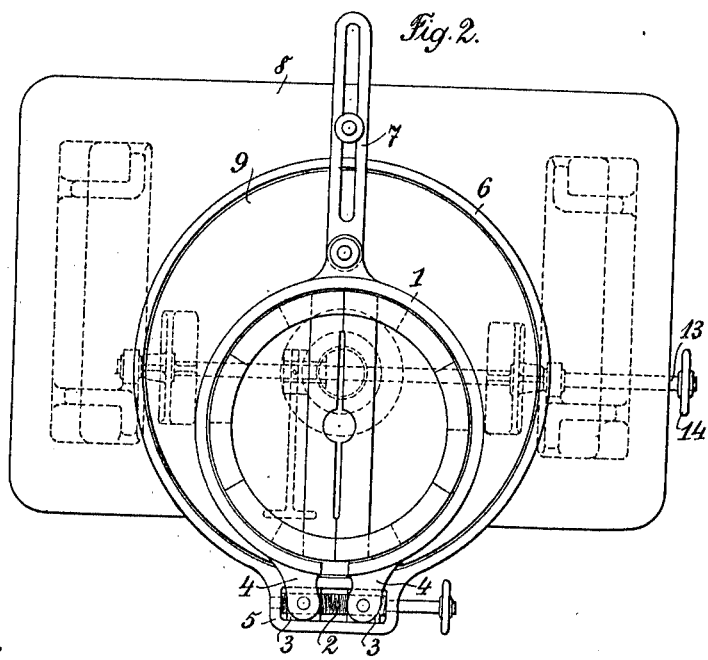

In the accompanying drawing: Figure 1 is an elevation partly in section and Fig. 2 is a plan of the apparatus.

The object particularly aimed at by this invention is to obtain pulleys composed of superposed layers or adjacent segments, the cylindrical surface of such pulleys being as smooth as possible so as to reduce the finishing work to the minimum.

A further object is to provide an apparatus permitting of carrying out the method explained below.

The method in accordance with my invention consists in successively inserting and pressing the segments constituting each layer of the pulley in combination with the layers already formed in an open resilient ring, the several layers being glued and then nailed one to another.

The apparatus used in this method consists broadly of a resilient open ring 1 adapted to be contracted and expanded by means of a right and left-handed screw spindle 2. Instead of making this ring resilient it might of course be hinged, but a resilient ring has proved to be superior in practice. The screw spindle comprises two threaded cheeks 3 upon which the lugs 4 on the ring 1 (which must be changed according to the diameter of the pulley to be manufactured) are secured by means of screws. The threaded portions 3 and the screw spindle 2 are mounted in a casing 5 which is integral with the table ring 6. As this ring 1 varies in diameter according to the size of pulley to be manufactured it is secured to the table 8 by means of slot guides 7. The work plate 9 is secured to a displaceable guide column inside the table ring and by means of two gear wheels 10 which mesh with racks 11 on the frame 12 and by means of a common shaft 13 mounted in bearings 19 on the work plate 9 can be raised and lowered by means of a hand wheel 14 secured on said shaft. To permit of fixing the work plate in any position the guide column 15 is provided with teeth in which a pawl 18 actuated by a handle 16 and rotatably mounted on the upright guide 17 is able to engage.

The apparatus is employed in the following manner: When the segments for the lowest layer of segments have been glued on their chamfered faces they are inserted in the opened ring 1 whereupon they are pressed tightly together by rotating the screw spindle 2. Hereupon the segments of which the second segmental ring is to be composed and also the two spoke portions are glued at the proper places and as shown in Fig. 2 placed upon the first layer after previously opening the ring 1 by rotating the screw spindle. When the two layers of segments have been compressed they are nailed together and after opening the ring 1 the segments for the third layer are inserted and so on until a pulley of the desired width has been formed. Each time a fresh layer of segments has been arranged in place the work plate is set lower by actuating the gear wheels 10 and the pawl 18 to the extent of one tooth, the height of which, corresponds to the thickness of a layer of segments.

Having thus described my invention, what I claim as new, and desire to secure by Letters Patent is:—

1. A method of assembling wooden belt pulleys in which the segments constituting each layer of the pulley are successively inserted in a resilient ring, glued to the layers already formed, pressed in combination with them in said resilient ring and nailed one to the other.

2. A method of assembling wooden belt pulleys consisting in pressing together the segments forming the first layer in a resilient ring, inserting in said ring the segments forming the second layer and gluing them to the first layer, pressing both layers together in said ring, nailing them to one another, inserting in said ring the segments forming the third layer and so proceeding until a pulley of the desired width has been formed, the several layers being thus successively pressed in combination with the layers already formed.

3. A method of assembling wooden belt pulleys consisting in pressing together the segments forming the first layer in a resilient ring, opening said ring, lowering by suitable means the first layer a distance equal to its own thickness, inserting in said ring the segments forming the second layer and gluing them to the first layer, closing said ring and pressing both layers together in the same, opening said ring, nailing the layers to one another, lowering the two layers a distance equal to the thickness of one layer, inserting in said ring the segments forming the third layer and so proceeding until a pulley of the desired width has been formed, the several layers being thus successively pressed in combination with the layers already formed.

4. In an apparatus for assembling wooden belt pulleys, the combination of an open resilient ring secured to a table, a work plate movable vertically and arranged underneath said ring and means for lowering and raising said plate and for fixing it in position.

5. In an apparatus for assembling wooden belt pulleys, the combination of a table having an aperture through which a work plate is adapted to be moved vertically, an open resilient ring removably secured to said table and held in position over said work plate by appropriate means, means for opening and closing said ring and means for vertically moving said plate and fixing it in position.

6. In an apparatus for assembling wooden belt pulleys the combination of a table having a rigid ring surrounding an aperture, an open resilient ring having lugs at its open ends, threaded cheeks in which a right and left handed screw spindle engages, a casing guiding said cheeks and spindle and connected to said table ring, a movable work plate adapted to register with the table aperture and means for lowering and raising said plate and fixing it in position.

7. In an apparatus for assembling wooden belt pulleys the combination of a table having an aperture, a workplate movable vertically and adapted to register with said opening, a rigid table frame provided with vertical racks, a hand controlled shaft mounted in bearings on said work plate and carrying toothed wheels meshing with said racks, a guide column rigidly connected to said work plate and provided with ratchet teeth, a fixed upright guide supporting said column and provided with a pawl engaging said ratchet teeth, an open resilient ring secured to the table and held in position over said work plate and a screw tightening device for opening or closing said resilient ring.

In testimony whereof I affix by signature in presence of two witnesses.

HANS WOTTLE.

Witnesses:
AUGUST FUGGER,
ADA MARIA BERGER.

---

Copies of this patent may be obtained for five cents each, by addressing the "Commissioner of Patents, Washington, D. C."